United States Patent
Jung

(10) Patent No.: US 10,083,116 B2
(45) Date of Patent: Sep. 25, 2018

(54) METHOD OF CONTROLLING STORAGE DEVICE AND RANDOM ACCESS MEMORY AND METHOD OF CONTROLLING NONVOLATILE MEMORY DEVICE AND BUFFER MEMORY

(71) Applicant: SAMSUNG ELECTRONICS CO., LTD., Suwon-si, Gyeonggi-do (KR)

(72) Inventor: Myung-June Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/499,243

(22) Filed: Apr. 27, 2017

(65) Prior Publication Data

US 2017/0344486 A1    Nov. 30, 2017

(30) Foreign Application Priority Data

May 25, 2016  (KR) .................. 10-2016-0064247

(51) Int. Cl.
*G06F 12/08*  (2016.01)
*G06F 12/12*  (2016.01)
*G06F 12/0888*  (2016.01)

(52) U.S. Cl.
CPC .......... *G06F 12/0888* (2013.01); *G06F 12/12* (2013.01); *G06F 2212/1044* (2013.01); *G06F 2212/60* (2013.01); *G06F 2212/69* (2013.01)

(58) Field of Classification Search
CPC ................ G06F 12/0888; G06F 12/12; G06F 2212/1044; G06F 2212/60
See application file for complete search history.

(56) References Cited

U.S. PATENT DOCUMENTS

| | | | |
|---|---|---|---|
| 7,634,585 B2 * | 12/2009 | Conley | G06F 12/0866 711/118 |
| 8,407,428 B2 | 3/2013 | Cheriton et al. | |
| 8,612,402 B1 | 12/2013 | Givargis | |
| 8,700,842 B2 | 4/2014 | Dinker | |
| 8,725,951 B2 | 5/2014 | Busch et al. | |
| 9,026,717 B2 * | 5/2015 | Ludwig | G06F 21/00 711/103 |
| 9,075,710 B2 | 7/2015 | Talagala et al. | |

(Continued)

OTHER PUBLICATIONS

Katelin A. Bailey et al., "Exploring Storage Class Memory with Key Value Stores", University of Washington Dept. of Computer Science and Engineering Seattle, WA, USA, Nov. 3, 2013, p. 1-8.

(Continued)

*Primary Examiner* — Aracelis Ruiz
(74) *Attorney, Agent, or Firm* — Volentine, Whitt & Francos, PLLC

(57) ABSTRACT

A method of controlling a storage device and a random access memory includes, when a size of write-requested data is greater than a threshold, writing the write-requested data in the storage device and writing an address of the storage device in which the write-requested data is written in the random access memory. When the size of the write-requested data is smaller than or equal to the threshold, the write-requested data is written in the random access memory. The threshold is correlated to a size greater than a size of an area allocated to store the address in the random access memory.

18 Claims, 12 Drawing Sheets

(56) References Cited

U.S. PATENT DOCUMENTS

| | | | |
|---|---|---|---|
| 2007/0005889 A1* | 1/2007 | Matthews | G06F 12/0888 |
| | | | 711/118 |
| 2009/0327613 A1* | 12/2009 | Nutter | G06F 12/0875 |
| | | | 711/141 |
| 2013/0275699 A1 | 10/2013 | Cheriton | |
| 2014/0156618 A1 | 6/2014 | Castellano | |
| 2014/0195720 A1 | 7/2014 | Akella et al. | |
| 2015/0248447 A1 | 9/2015 | Mooser | |

OTHER PUBLICATIONS

Martin Faust et al., "Fast Lookups for In-Memory Column Stores: Group-Key Indices, Lookup and Maintenance," The Third International Workshop on Accelerating Data Management Systems using Modern Processor and Storage Architectures (ADMS'12), 2012, pp. 1-10.

Hyeontaek Lim et al., "MICA: A Holistic Approach to Fast In-Memory Key-Value Storage", Carnegie Mellon University, KAIST, Intel Labs, pp. 1-16.

Hyeontaek Lim et al.,"SILT: A Memory-Efficient, High-Performance Key-Value Store", Carnegie Mellon University, Intel Labs, pp. 1-13.

\* cited by examiner

METHOD OF CONTROLLING STORAGE DEVICE AND RANDOM ACCESS MEMORY AND METHOD OF CONTROLLING NONVOLATILE MEMORY DEVICE AND BUFFER MEMORY

CROSS-REFERENCE TO RELATED APPLICATIONS

This U.S. non-provisional patent application claims priority under 35 U.S.C. § 119 to Korean Patent Application No. 10-2016-0064247, filed on May 25, 2016 in the Korean Intellectual Property Office, the entire contents of which are hereby incorporated by reference.

BACKGROUND

1. Technical Field

The present disclosure relates to semiconductor devices. More particularly, the present disclosure relates to a method of controlling a storage device and a random access memory and a method of controlling a nonvolatile memory device and a buffer memory.

2. Background Information

To manage a large amount of data, a device and a method for managing data using an object oriented methodology are being researched. An object may include object data and an object identifier. A host device (or client device) may identify object data using an object identifier, and may request a write and a read of the object data using the object identifier. However, a storage device performs write and read operations based on addresses rather than object identifiers. Thus, an index which correlates the object identifier and the addresses (to which the object data are written) has to be managed.

The index is usually managed in a random access memory different than the storage device. An operating speed of the random access memory is higher than an operating speed of the storage device. Thus, if a part of object data is written in the random access memory instead of the storage device, an overall system speed may be improved. However, concrete and effective methods to implement the overall system have not been suggested until now. Thus, an urgent demand exists for research on specific and effective methods and devices for writing a part of data in the random access memory, i.e., in which the index is stored, instead of in the storage device.

SUMMARY

Example embodiments of the present disclosure provide a method of controlling a storage device and a random access memory. When a size of write-requested data is greater than a threshold, the method may include writing the write-requested data in the storage device and writing an address of the storage device in which the write-requested data is written in the random access memory. When the size of the write-requested data is smaller than or equal to the threshold, the method may include writing the write-requested data in the random access memory. The threshold is correlated to a size greater than a size of an area allocated to store the address in the random access memory.

Example embodiments of the present disclosure also provide a method of controlling a nonvolatile memory device and a buffer memory. When a size of write-requested data is greater than a threshold, the method may include writing, by a controller, the write-requested data in the nonvolatile memory device and writing an address of the nonvolatile memory device in the buffer memory as an index. When the size of the write-requested data is smaller than or equal to the threshold, the method may include writing, by the controller, the write-requested data in the buffer memory and writing location information of the write-requested data in the buffer memory as the index. The threshold is correlated to a size greater than a size of an area allocated to store the address in the buffer memory.

BRIEF DESCRIPTION OF THE FIGURES

Embodiments of the present disclosure will be described below in more detail with reference to the accompanying drawings. The embodiments of the present disclosure may, however, be embodied in different forms and should not be constructed as limited to the embodiments set forth herein. Rather, these embodiments are provided so that this disclosure will be thorough and complete, and will fully convey the scope of the concepts described herein to those skilled in the art Like numbers refer to like elements throughout.

DETAILED DESCRIPTION OF THE EMBODIMENTS

Figure 1:
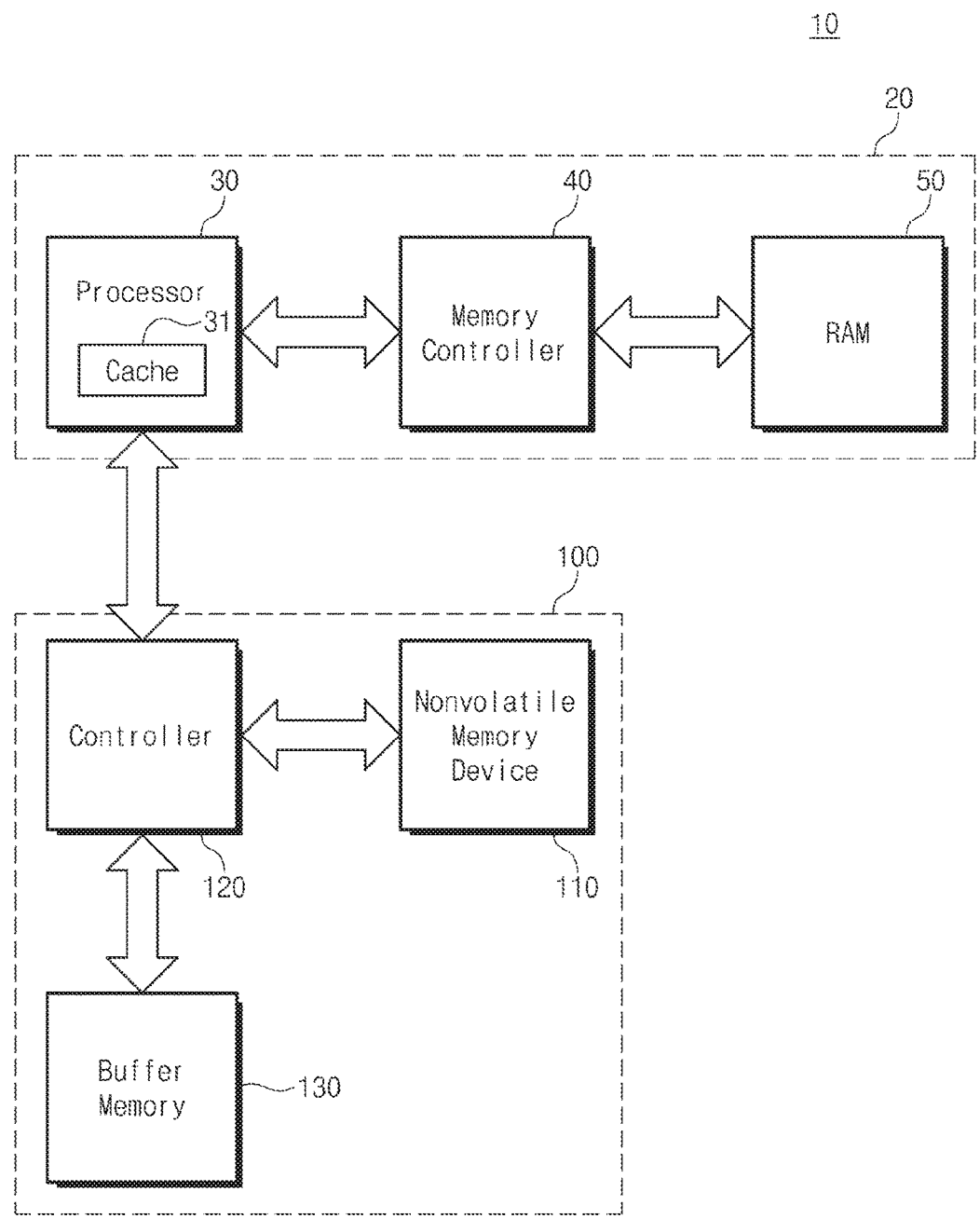
FIG. 1 is a block diagram illustrating a computing system according to example embodiments of the present disclosure.

Embodiments of the present disclosure will be described more fully hereinafter with reference to the accompanying drawings, in which embodiments are shown. The concepts described herein may, however, be embodied in many different forms and should not be construed as being limited to the embodiments set forth herein. Rather, these embodiments are provided so that this disclosure will be thorough and complete, and will fully convey the scope of the concepts described herein to those skilled in the art. In the drawings, the size and relative sizes of layers and regions may be exaggerated for clarity. Like numbers refer to like elements throughout.

FIG. 1 is a block diagram illustrating a computing system according to example embodiments of the present disclosure. Referring to FIG. 1, the computing system 10 includes a host device 20 and a storage device 100. The host device 20 includes a processor 30, a memory controller 40, and a random access memory (RAM) 50.

The processor 30 may include a cache 31. The processor 30 can access the RAM 50 through the memory controller 40. For example, a channel through which the processor 30 and the memory controller 40 communicate with each other may be a memory interface of a Northbridge chip. The memory controller 40 may also be integrated inside the processor 30. The RAM 50 may include a dynamic random access memory (DRAM), a synchronous random access memory (SDRAM), a phase-change random access memory (PRAM), a magnetic random access memory (MRAM), a resistive random access memory (RRAM), a ferroelectric random access memory (FRAM), etc.

The storage device 100 may perform write, read, and erase operations according to a request of the host device 20. For example, the storage device 100 may communicate with the host 20 through a channel of Southbridge chip. The storage device 100 may include a nonvolatile memory device 110, a controller 120, and a buffer memory 130.

The nonvolatile memory device 110 may include a flash memory, a phase-change random access memory (PRAM), a resistive random access memory (RRAM), and a ferroelectric random access memory (FRAM). The controller 120 may control write, read and erase operations of the nonvolatile memory device 110 using the buffer memory 130. The buffer memory 130 may include a random access memory such as a dynamic random access memory (DRAM), a synchronous random access memory (SDRAM), a phase-change random access memory (PRAM), a magnetic random access memory (MRAM), a resistive random access memory (RRAM), a ferroelectric random access memory (FRAM), etc.

For example, the computing system 10 may be a storage server or a cache server. The host device 20 may receive an access request like a write request or a read request from an external client device or an application server. The access request may be an object-based request. An object-based write request may include an object identifier and object data instead of an address and data. An object-based read request may include an object identifier instead of an address. The processor 30 may store object data in the storage device 100 or the random access memory (RAM) 50. The processor 30 may store an index in the random access memory (RAM) 50. The index may indicate a relationship between location information of a location or locations at which object data is stored in the storage device 100 and an object identifier for the object of the object data. For example, the object identifier may be generated from a key of a key-value store or a key.

The processor 30 may write object data in the random access memory (RAM) 50 or the storage device 100 and may reflect a writing result into an index stored in the random access memory (RAM) 50. The processor 30 may read object data from the random access memory (RAM) 50 or the storage device 100 with reference to the index stored in the random access memory (RAM) 50.

The processor 30 may transmit an address-based access request to the storage device 100. When transmitting a write request to the storage device 100, the processor 30 may transmit object data and an address of the storage device 100 in which the object data is to be stored into the storage device 100. The processor 30 may register an address of the storage device 100 in the random access memory (RAM) 50 as location information (or a part of the index). When transmitting a read request to the storage device 100, the processor 30 may obtain (or secure) an address of the storage device 100 with reference to the index stored in the random access memory (RAM) 50. The processor 30 may transmit the secured address to the storage device 100. The storage device 100 may perform a write, read or erase operation using the buffer memory 130 according to the address being transmitted from the processor 30.

The processor 30 may use the random access memory (RAM) 50 as a main memory of the host device 20. The random access memory (RAM) 50 may store not only the index and the object data but also various information, codes, and instances of applications which are necessary for operating the host device 20.

The buffer memory 130 of the storage device 100 may be used as an operating memory of the storage device 100. The buffer memory 130 may temporarily store (e.g., buffering) data which the storage device 100 exchanges with the host device 20 and may store various information, codes, etc. which are needed when the controller 120 manages the storage device 100.

The buffer memory 130 of the storage device 100 may be provided inside the controller 120. For example, the buffer memory 130 may be an internal static random access memory (SRAM) of the controller 120.

The controller 120 may further include a cache (not illustrated). When a cache hit occurs, the controller 120 may access the cache instead of the nonvolatile memory device 110. When a cache miss occurs, the controller 120 may access the nonvolatile memory device 110 using the buffer memory 130. When a cache flush is performed, the controller 120 may write dirty data stored in the cache in the nonvolatile memory device 110.

Figure 2:
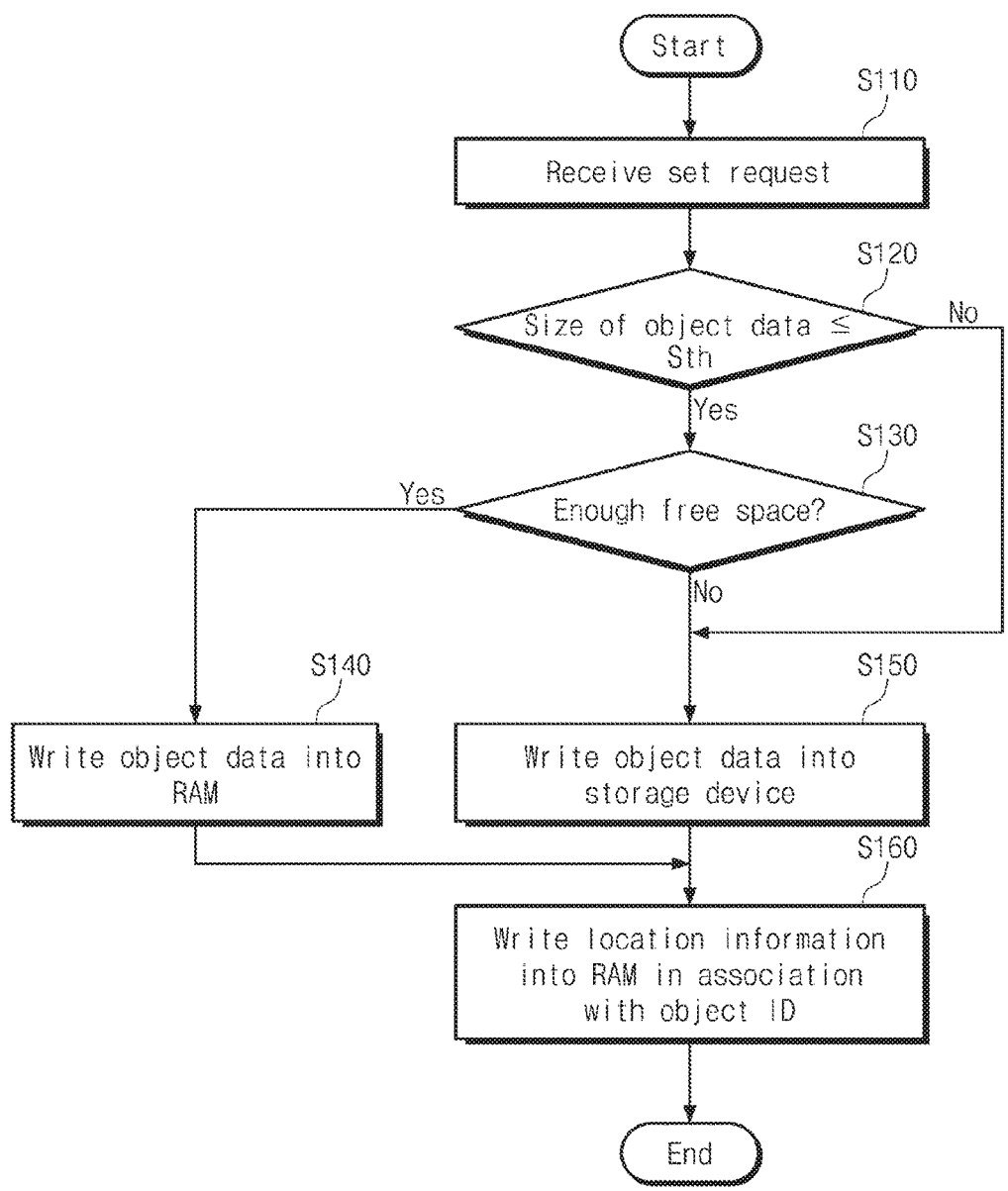
FIG. 2 is a flowchart illustrating an example of a method of controlling a random access memory, and a storage device or a nonvolatile memory device.

FIG. 2 is a flowchart illustrating an example of a method of controlling a random access memory, and a storage device or a nonvolatile memory device. Referring to FIGS. 1 and 2, in an operation S110, the host device 20 may receive a write request from an external device. For example, the processor 30 may receive the write request from the external device. The write request may be a set request. The write request may request writing of object data (e.g., key and value).

In an operation S120, the processor 30 determines whether a size of the write-requested object data is smaller than a threshold size (Sth). When the size of the write-requested object data is smaller than the threshold size (Sth) (S120=Yes), in an operation S130, the processor 30 determines whether enough free space exists in the random access memory (RAM) 50. The processor 30 may determine whether a free space of an area in the random access memory (RAM) 50, allocated to store the object data, is greater than the size of the object data. In the case where enough free space exists (S130=Yes), an operation S140 is performed. In the operation S140, the processor 30 can write the write-requested object data in the random access memory (RAM) 50 through the memory controller 40.

When the size of the object data is greater than the threshold size (Sth) (S120=No) or the free space of the random access memory (RAM) 50 is not enough (S130=No), an operation S150 is performed. In the operation S150, the processor 30 may write the write-requested object data in the storage device 100.

After the write-requested object data is written in the random access memory (RAM) 50 or the storage device 100, in an operation S160, the processor 30 may write location information of a location or locations at which the object data is written into the random access memory (RAM) 50, for example as a part of the index. The processor 30 may select a key or identification data generated from the key as an object identifier and may write the object identifier and the location information in the random access memory (RAM) 50 in relation to each other, for example as a part of the index. For example, in the case where the object identifier is stored in the random access memory (RAM) 50 in advance, the processor 30 may update (or overwrite) the location information associated with the object identifier in the random access memory (RAM) 50. In the case where the object identifier is not stored in the random access memory (RAM) 50 in advance, the processor 30 may newly write the object identifier and the location information in the random access memory (RAM) 50.

In the case where the object data is written in the random access memory (RAM) 50, the location information may indicate a location inside the storage space of the random access memory (RAM) 50. In the case where the object data is written in the storage device 100, the location information may indicate a location inside the storage space of the storage device 100.

As described above, when the size of the object data is smaller than the threshold size (Sth) and enough free space exists in the random access memory (RAM) 50, the object data is written in the random access memory (RAM) 50. When the size of the object data is greater than the threshold size (Sth), or when enough free space does not exist in the random access memory (RAM) 50 even though the size of the object data is smaller than the threshold size (Sth), the object data is written in the storage device 100. Since the object data is written in the storage device 100 or the random access memory (RAM) 50 depending on the size of the object data, an overall operating speed of the computing system 10 is improved as compared with a time when all the object data are written in the storage device 100.

The object data is a group of related data managed by an object-based data system and a size of the object data may vary. The size of the object data may be independent of an input/output bandwidth of the host device 20 or the storage device 100. The size of the object data may correspond to one or more inputs/outputs of the host device 20 or the storage device 100.

The threshold size (Sth) may be greater than a size of a storage space in the random access memory (RAM) 50 that is allocated to store location information. For example, the threshold size (Sth) may be two times as large as the size of a storage space allocated to store location information. This is possible insofar as the storage space may have much more available space, such as two, three or even more times as much available space as the space allocated to store location information. When the threshold size (Sth) is set to be greater than a size of a storage space allocated to storing location information, even object data greater than the size of the allocated storage space may be written in the random access memory (RAM) 50. Thus, an operating speed of the computing system 10 is improved more as compared with writing only object data smaller than the size of the allocated storage space (i.e., allocated to storing location information) in the random access memory (RAM) 50.

Figure 3:
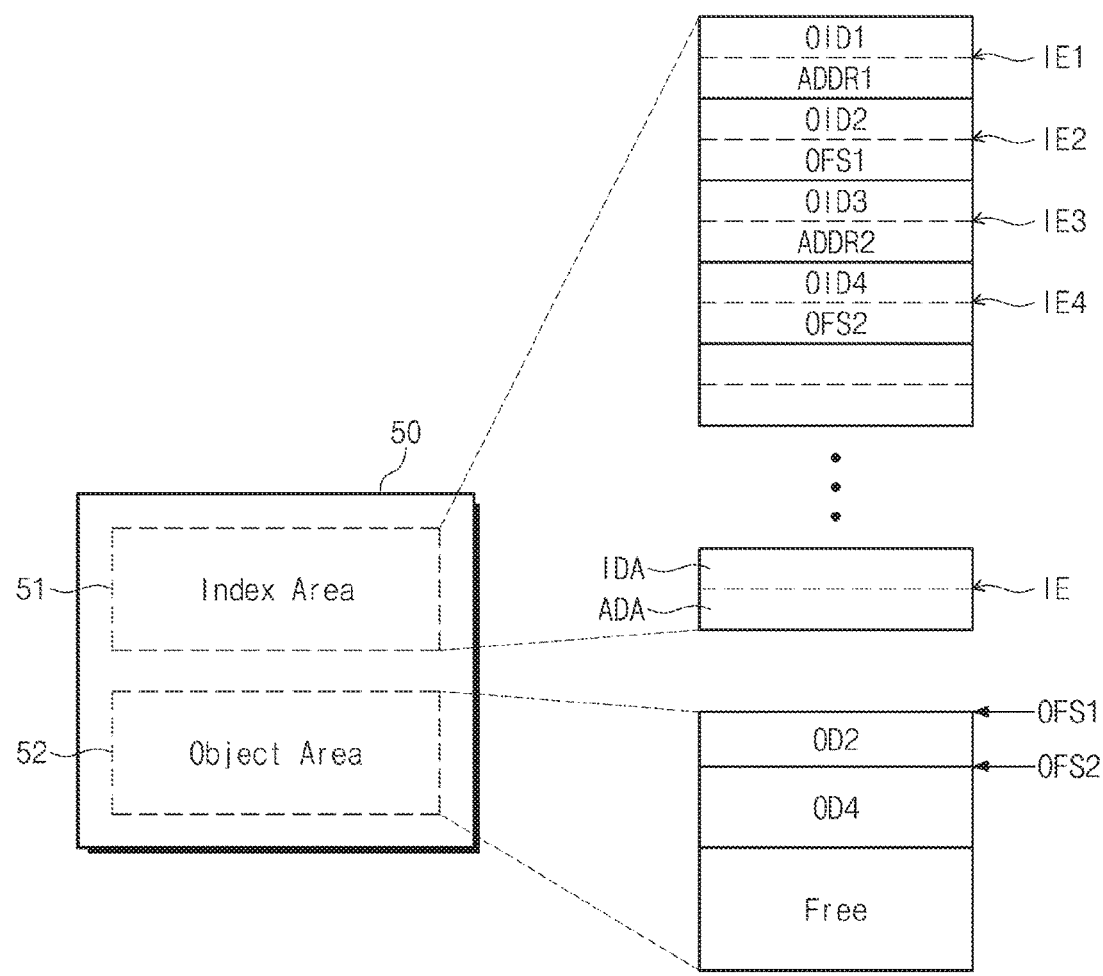
FIG. 3 illustrates an example where a random access memory is managed by a processor.

FIG. 3 illustrates an example where a random access memory is managed by a processor. Referring to FIGS. 1 and 3, the processor 30 may divide a storage space of the random access memory (RAM) 50 into an index area 51 and an object area 52 to manage the index and the object data.

The processor 30 may write index entities (IEs) in the index area 51. Each of the index entities (IEs) includes an identifier area (IDA) and an address area (ADA). When new object data is written in the storage device 100 or the object area 52 of the random access memory (RAM) 50, the processor 30 generates an index entity (IE) of corresponding object data and writes an object identifier in the identifier area (IDA). The processor 30 may also write location information of a location or locations at which object data is written in the address area (ADA) of the index entity (IE). A size of the identifier area (IDA) and a size of the address area (ADA) may be a fixed value determined by the whole system to which the computing system 10 belongs.

When the location information of the object data written in the storage device 100 or the object area 52 of the random access memory (RAM) 50 is updated, the processor 30 may update (or overwrite) the address area (ADA) of corresponding index entity (IE). An update of the location information may occur when the object data is updated.

The processor 30 may write object data that satisfies the conditions described with reference to FIG. 2 (S120=Yes, S130=Yes) in the object area 52.

Figure 4:
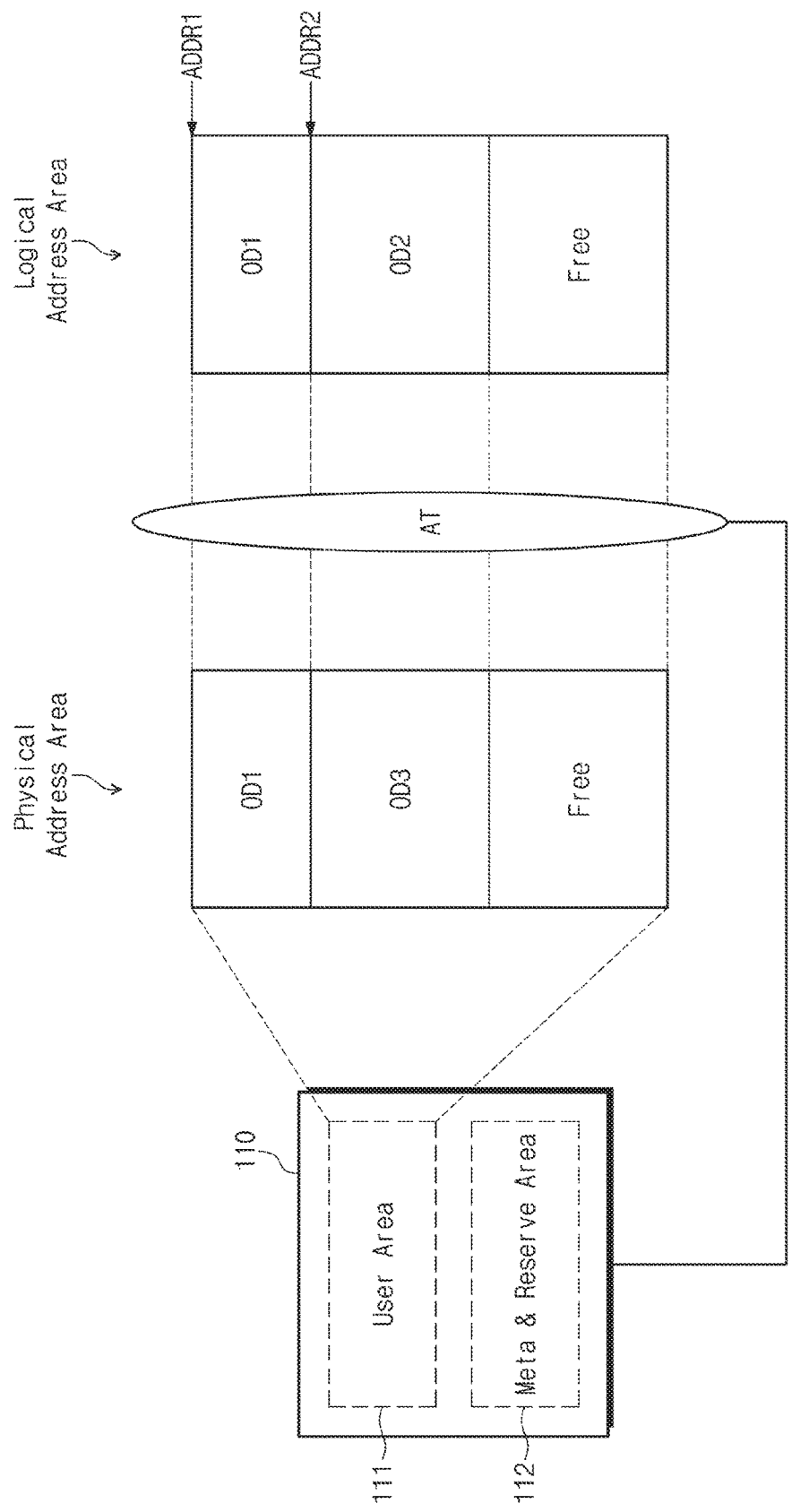
FIG. 4 illustrates an example where a nonvolatile memory device is managed.

In FIG. 4, four items of object data are written in the computing system 10 to either the storage device 100 or the random access memory (RAM) 50. As the four items of object data are written, four index entities (IE1 to IE4) may be written in the index area 51.

The first index entity (IE1) may store a first object identifier (OID1) corresponding to first object data (OD1) (refer to FIG. 4), and location information of the first object data (OD1). The first object data (OD1) may be written in the storage device 100. The location information of the first object data (OD1) may be a first address (ADDR1) indicating a storage space of the storage device 100 at which the first object data (OD1) is written. The first address (ADDR1) may include a beginning address or size information.

The second index entity (IE2) may store a second object identifier (OID2) corresponding to second object data (OD2), and location information of the second object data (OD2). The second object data (OD2) may be written in the object area 52 of the random access memory (RAM) 50. Thus, the location information of the second object identifier (OID2) may be a first offset (OFS1) indicating a location where the second object data (OD2) is written in the object area 52. The second object data (OD2) is stored in an area identified by consecutive addresses. The first offset (OFS1) may indicate the lowest (or highest) address of an area in which the second object data (OD2) is written.

The third index entity (IE3) may store a third object identifier (OID3) corresponding to third object data (OD3) (refer to FIG. 4), and location information of the third object data (OD3). The third object data (OD3) may be written in the storage device 100. The location information of the third object data (OD3) may be a third address (ADDR3) indicating a storage space of the storage device 100 at which the third object data (OD3) is written. The third address (ADDR3) may include a beginning address or size information.

The fourth index entity (IE4) may store a fourth object identifier (OID4) corresponding to fourth object data (OD4), and location information of the fourth object data (OD4). The fourth object data (OD4) may be written in the object area 52 of the random access memory (RAM) 50. Thus, the location information of the fourth object identifier (OID4) may be a second offset (OFS2) indicating a location where the fourth object data (OD4) is written in the object area 52. The fourth object data (OD4) is stored in an area identified by consecutive addresses. The second offset (OFS2) may indicate the lowest (or highest) address of an area in which the fourth object data (OD4) is written.

A free space of the object area 52 indicates an empty space in which object data is not written.

FIG. 4 illustrates an example where a nonvolatile memory device is managed. Referring to FIGS. 1 and 4, the controller 120 of the storage device 100 may divide a storage space of the nonvolatile memory device 110 into a user area 111 and a meta & reserve area 112 for management. The user area 111 may be a storage space of the storage device 100. The processor 30 or another element of the host device 20 is provided with the user area 111 by the storage device 100. That is, the user area 111 may be an area identified as a storage space of the storage device 100 by for and/or for the use of the processor 30 or another element of the host device 20.

The meta & reserve area 112 may be an area which is not provided to the processor 30 or another element of the host device 20 by the storage device 100, but is instead used by the storage device 100 to manage the user area 111 or the storage device 100. The meta & reserve area 112 may store mapping information between a physical address and a logical address. The physical address identifies a storage space of the nonvolatile memory device 110. The logical address is provided to the processor 30 or other element of the host device 20 by the storage device 100 as an address mapping table (AT). When a part of the user area 111 becomes unavailable, the meta & reserve area 112 may also include an area which is provided for incorporation into the user area 111 to replace the corresponding unavailable area. The address mapping table (AT) stored in the meta & reserve area 112 may be loaded into the buffer memory 130 to be used.

As described with reference to FIG. 3, the first object data (OD1) and the third object data (OD3) may be written in the nonvolatile memory device 110 of the storage device 100. The processor 30 or another element of the host device 20 may request the writing of the first object data (OD1) and the third object data (OD3) from the storage device 100 together with the first address (ADDR1) and the second address (ADDR2). The controller 120 may write the first object data (OD1) according to the first address (ADDR1) in the logical address area of the user area 111 of the nonvolatile memory device 110. For example, the controller 120 may convert the first address (ADDR1) into a physical address of the physical address area using the address mapping table (AT), and may write the first object data (OD1) in a storage space corresponding to the converted physical address. The controller 120 may write the third object data (OD3) according to the second address (ADDR2) in the logical address area of the user area 111 of the nonvolatile memory device 110. For example, the controller 120 may convert the second address (ADDR2) into a physical address of the physical address area using the address mapping table (AT), and may write the third object data (OD3) in a storage space corresponding to the converted physical address.

A free space of the user area 111 indicates an empty space in which object data (or other data that would normally require retention) is not written.

Figure 5:
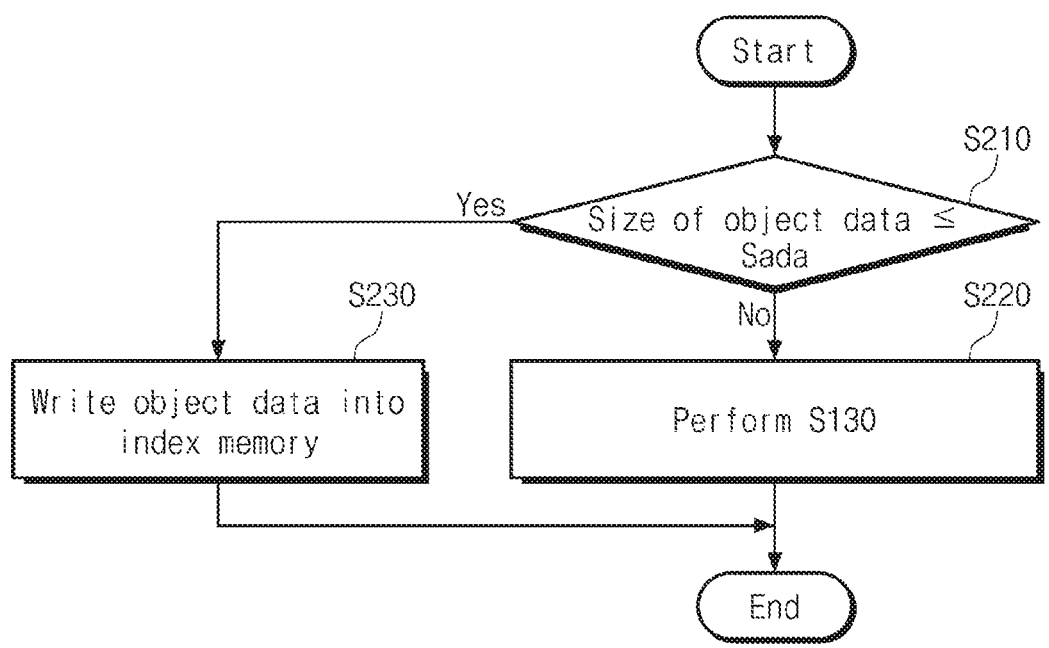
FIG. 5 is a flowchart illustrating an example of a method of controlling a random access memory and a storage device, or of controlling a nonvolatile memory device.

FIG. 5 is a flowchart illustrating an example of a method of controlling a random access memory and a storage device, or of controlling a nonvolatile memory device. The method of FIG. 5 may be performed when in the operation S120 of FIG. 2, it is determined that a size of the object data is smaller than the threshold size (Sth) (S120=Yes).

Referring to FIGS. 1, 3 and 5, in an operation S210, the processor 30 may determine whether a size of the object data is smaller than a size (Sada) of the address area (ADA). When a size of the object data is smaller than a size (Sada) of the address area (ADA), in an operation S230, the processor 30 may write the object data in the index area 51. When a size of the object data is greater than a size (Sada) of the address area (ADA), the processor 30 may perform the operation S130 of FIG. 2.

Figure 6:
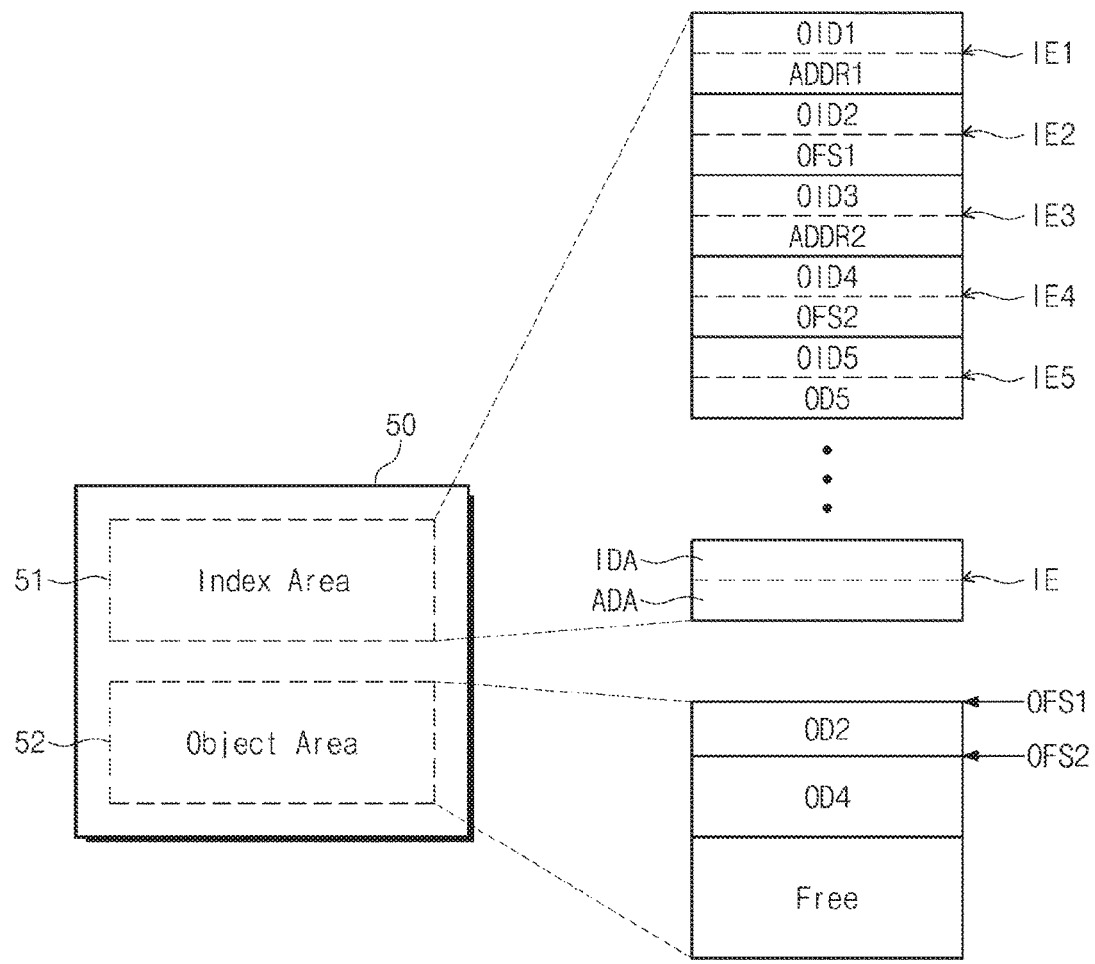
FIG. 6 illustrates an example where object data is written in an index region according to the method of FIG. 5.

FIG. 6 illustrates an example where object data is written in an index region according to the method of FIG. 5. In comparison with FIG. 3, a fifth object entity IE5 is written in the index area 51. The fifth object entity IE5 includes a fifth object identifier OID5 of a fifth object data OD5. Since a size of the fifth object data OD5 is smaller than the size (Sada) of the address area (ADA), the fifth object data OD5 may be written in the address area (ADA) of the fifth object entity IE5.

As described with reference to FIGS. 1 through 6, object data may be written in three different ways depending on a size of the object data. In the case where a size of the object data is greater than the threshold size (Sth) (S120=No), the object data (e.g., OD2 or OD4) is written in the storage device 100. The object identifier (e.g., OID1 or OID3) may be written in the object entity (e.g., IE1 or IE3) in relation to the address (e.g. ADDR1 or ADDR2) of the storage device 100.

In the case where a size of the object data is smaller than the size (Sada) of the address area (ADA) (S210=Yes), the object data (e.g., OD5) is written in the index entity (e.g., IE5) of the index area 51 in relation to the object identifier (e.g., OID5).

In the case where a size of the object data is smaller than the threshold size (Sth) (S120=Yes) and is greater than the size (Sada) of the address area (ADA) (S130=No), the object data is preferentially stored in the random access memory (RAM) 50, in which case the object data (e.g., OD2 or OD4) is written in the object area 52. The object identifier (e.g., OID2 or OID5) may be written in the object entity (e.g., IE2 or IE4) in relation to the offset (e.g., OFS1 or OFS2). When enough free space does not exist in the object area 52 (S130=No), the object data may be written in the storage device 100 similar to when a size of the object data is greater than the threshold size (Sth).

As described above, when a method of writing object data is subdivided according to a size of the object data, resource consumption of, for example, the random access memory (RAM) 50 may be reduced simultaneously. The operating speed of the computing system 10 can be improved.

Figure 7:
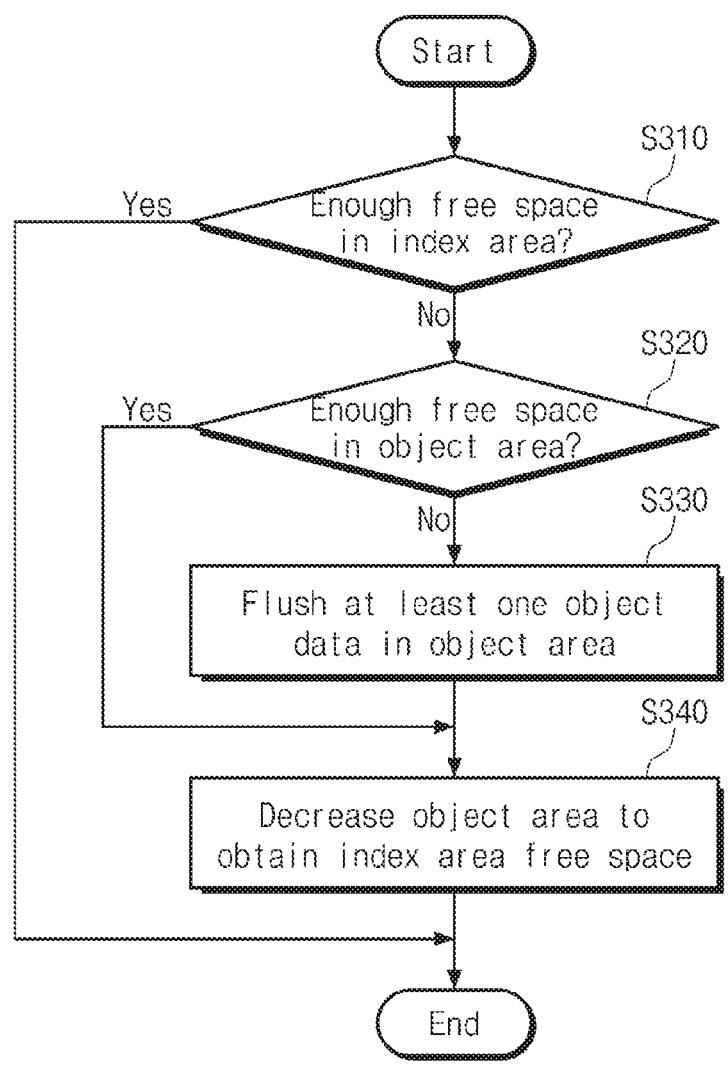
FIG. 7 illustrates an example of a method in which a processor manages a storage space of a random access memory.

FIG. 7 illustrates an example of a method in which the processor 30 manages a storage space of the random access memory (RAM) 50. Referring to FIGS. 1 and 7, in an operation S310, the processor 30 determines whether enough free space exists in the index area 51. For example, the processor 30 may determine whether a size of a free space of the index area 51 is greater than a first threshold size. When the size of the free space is greater than the first threshold size (S310=Yes), the processor 30 may end the method of FIG. 7. When the size of the free space is smaller than the first threshold size (S310=No), the processor 30 may perform an operation S320.

In an operation S320, the processor 30 determines whether enough free space exists in the object area 52. For example, the processor 30 may determine whether a size of a free space of the object area 52 is greater than a second threshold size. The second threshold size may be greater than the first threshold size. When the size of the free space of the object area 52 is greater than the second threshold size (S320=Yes), the processor 30 may perform an operation S340. When the size of the free space of the object area 52 is smaller than the second threshold size (S320=No), the processor 30 may perform the operation S340 after performing an operation S330.

In the operation S330, the processor 30 may flush at least one object data written in the object area 52 to the storage device 100. The processor 30 may manage an access count of object data written in the object area 52. The processor 30 may flush at least one object data of which an access count is smaller than a threshold count to the storage device 100. The processor 30 may manage information such as of times when object data is written in the object area 52. The processor 30 may flush the earliest written object data in the object area 52 to the storage device 100. As the object data is flushed to the storage device 100, the processor 30 may update an offset of a corresponding index entity with an address of the storage device 100. The processor 30 may obtain a free space greater than the second threshold size in the object area 52 by flushing at least one object data.

In the operation S340, the processor 30 may also reduce a size of the object area 52 to increase a free space size of the index area 51. The processor 30 may change (or set) a part of the free space of the object area 52 to a free space of the index area 51. The method of FIG. 7 may be performed when a write request is received from an external device or after a write request is performed. The method of FIG. 7 may be performed according to a predetermined time period or an access (e.g., write) period.

Figure 8:
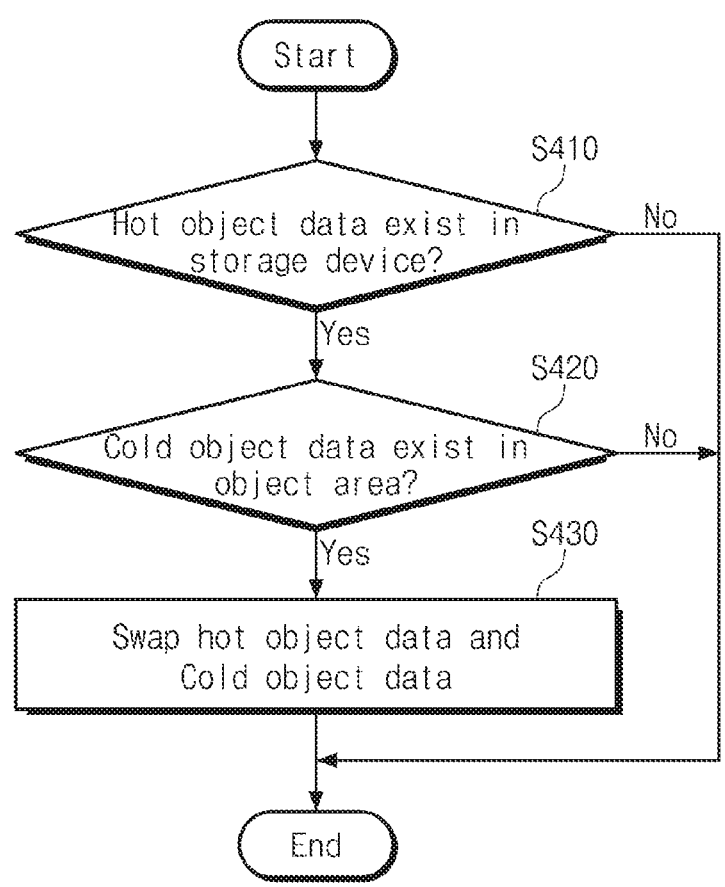
FIG. 8 is a flowchart illustrating a method in which a processor swaps object data written in an object region for object data written in a storage device.

FIG. 8 is a flowchart illustrating a method in which a processor swaps object data written in an object region for object data written in a storage device. Referring to FIGS. 1 and 8, in an operation S410, the processor 30 determines whether hot object data exists in the storage device 100. The hot object data may be object data having an access frequency greater than a threshold value. The hot object data may be object data having an access frequency greater than the threshold value during a predetermined time period.

In an operation S420, the processor 30 determines whether cold object data exists in the object area 52. The cold object data may be object data having an access frequency smaller than the threshold value. The cold object data may be object data having an access frequency smaller than the threshold value during a predetermined time period.

When the hot data exists in the storage device 100 (S410=Yes) and the cold data exists in the object area 52 (S420=Yes), in an operation S430, the processor 30 may swap the hot data of the storage device 100 for the cold data of the object area 52. The processor 30 may flush the cold data of the object area 52 to the storage device 100. The processor 30 may write (e.g., move) the hot data of the storage device 100 in the object area 52.

When hot data exists in the storage device 100 and enough free space exists in the object area 52, the processor 30 may write (e.g., move) the hot data of the storage device 100 in the free space of the object area 52 without determining whether cold data exists in the object area 52.

Figure 9:
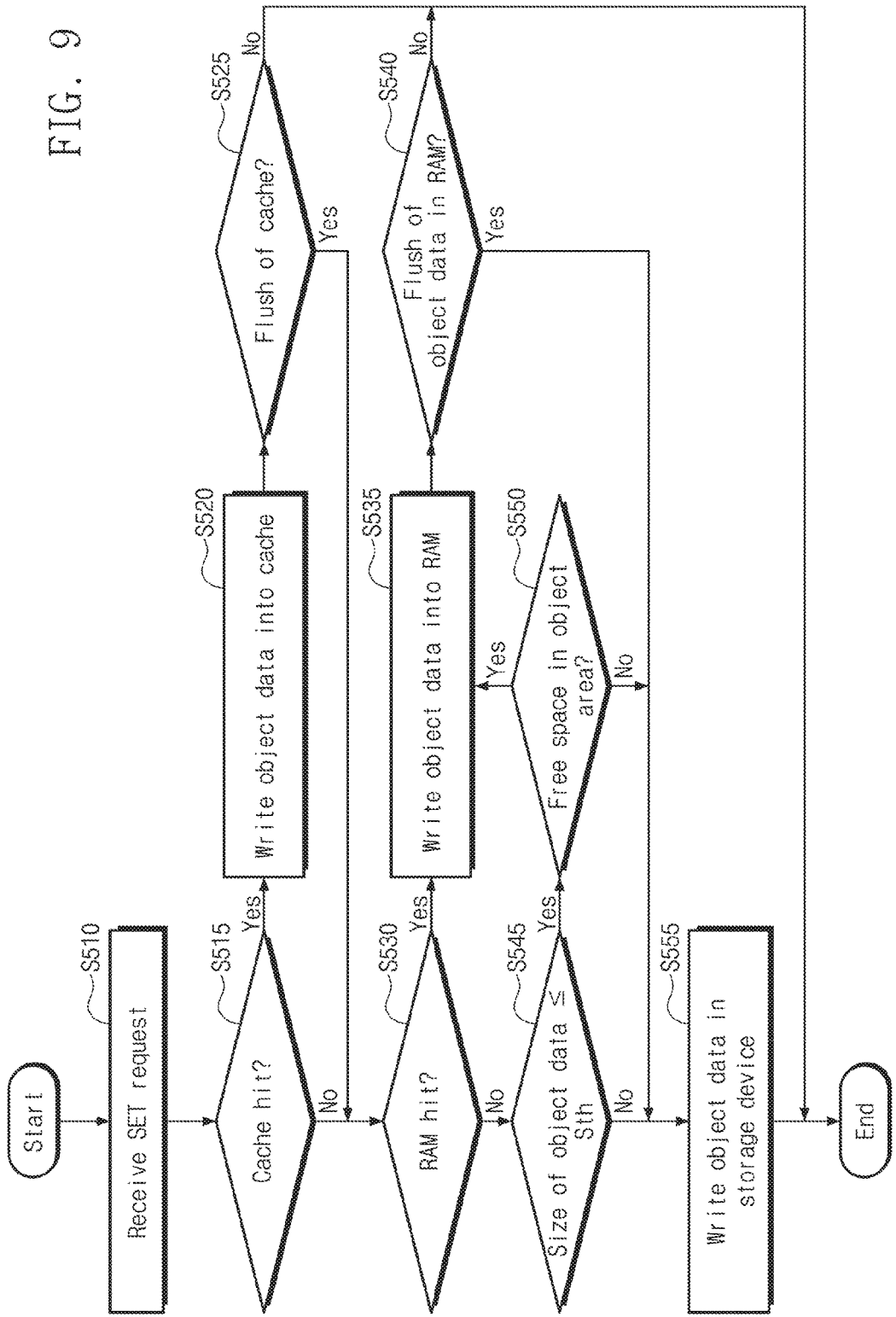
FIG. 9 is a flowchart illustrating an example of the whole flow where a computing system performs the writing of object data.

FIG. 9 is a flowchart illustrating an example of the whole flow where the computing system 10 performs the writing of object data. Referring to FIGS. 1 and 9, in an operation S510, the processor 30 may receive a write request. The write request may be a SET request.

In an operation S515, the processor 30 may determine whether a cache hit occurs. When a write request is an update request and update-requested object data is stored in the cache 31, a cache hit may occur. When at least one part of the update-requested object data is stored in the cache 31, a cache hit may occur.

When a cache hit occurs (S515=Yes), in an operation S520, the processor 30 may write object data in the cache 31. In an operation S525, the processor 30 determines whether a flush of the cache 31 occurs. When the flush of the cache 31 does not occur (S525=No), the write operation is finished. When the flush of the cache 31 occurs (S525=Yes), an operation S530 is performed.

In the operation S530, the processor 30 determines whether a hit of the random access memory (RAM) 50 occurs. When a write request is an update request and update-requested object data is stored in the object area 52 of the random access memory (RAM) 50, a hit of the random access memory (RAM) 50 may occur. The processor 30 may determine whether a hit occurs with respect to the write-requested object data or object data written by a flush of the cache 31.

When a hit occurs, in an operation S535, the processor 30 may write object data in the object area 52 of the random access memory (RAM) 50. In an operation S540, the processor 30 determines whether a flush of object data of the random access memory (RAM) 50 occurs. When a flush of the object data does not occur (S540=No), the write operation is finished. When a flush of the object data occurs (S540=Yes), an operation S555 is performed.

In an operation S545, the processor 30 determines whether a size of the object data is smaller than or equal to a threshold size (Sth). For example, the processor 30 may determine whether a size of write-requested object data or object data written by a flush of the cache 31 is smaller than or equal to the threshold size (Sth).

When the size of the object data is smaller than or equal to the threshold size (Sth) (S545=Yes), in an operation S550, the processor 30 determines whether enough free space exists in the object area 52. When enough free space exists in the object area 52 (S550=Yes), the processor 30 may perform the operation S535.

When the size of the object data is greater than the threshold size (Sth) (S545=No), when enough free space does not exist in the object area 52 (S550=No), or when a flush of the object data of the object area 52 of the random access memory (RAM) 50 has occurred (S540=Yes), the processor 30 performs an operation S555. In the operation S555, the processor 30 may write the object data in the storage device 100. For example, the write-requested object data, the object data written by a flush of the cache 31, or the object data written by a flush of the object area 52, may be written in the storage device 100.

Figure 10:
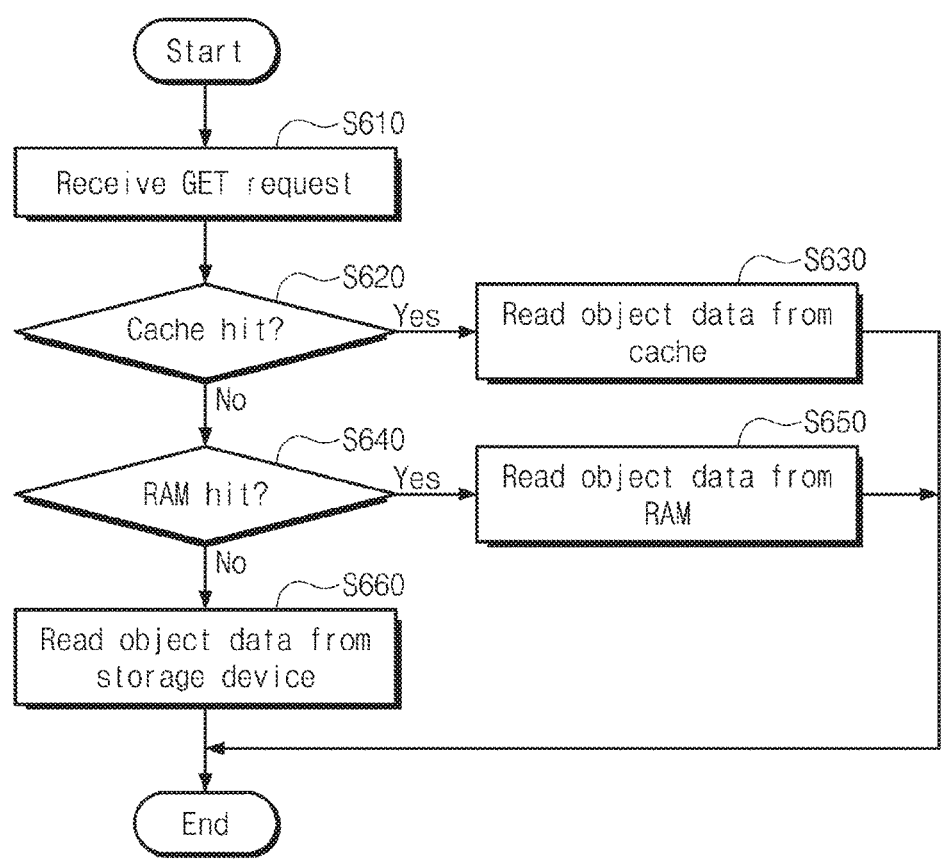
FIG. 10 is a flowchart illustrating an example of the whole flow where a computing system performs the reading of object data.

FIG. 10 is a flowchart illustrating an example of the whole flow where the computing system 10 performs the reading of object data. Referring to FIGS. 1 and 10, in an operation S610, the processor 30 may receive a read request. The read request may be a GET request.

In an operation S620, the processor 30 may determine whether a cache hit occurs. When object data which is read-requested is stored in the cache 31, a cache hit may occur. When at least one part of the object data which is read-requested is stored in the cache 31, a cache hit may occur.

When a cache hit occurs (S620=Yes), in an operation S630, the processor 30 may read object data from the cache 31. After that, a read operation is finished.

When a cache hit does not occur (S620=No), that is, a cache miss occurs, in an operation S640, the processor 30 determines whether a hit of the random access memory (RAM) 50 occurs. When the object data which is read-requested is stored in the object area 52, a hit of the random access memory (RAM) 50 may occur.

When a hit occurs (S640=Yes), in an operation S650, the processor 30 may read object data from the object area 52 of the random access memory (RAM) 50. The processor 30 may refer to an index entity of the object data which is read-requested in the index area 51. The processor 30 may obtain an offset from the index entity and may read object data from the object area 52 using the offset. After that, a read operation is finished.

When a hit of the random access memory (RAM) 50 does not occur (S640=No), in an operation S660, the processor 30 may read object data from the storage device 100. The processor 30 may refer to an index entity of the object data which is read-requested in the index area 51. The processor 30 may obtain an address of the storage device 100 from the index entity and may read object data from the storage device 100 using the address. After that, a read operation is finished.

When reading the object data from the storage device 100, if a free space exists in the object area 52 of the random access memory (RAM) 50, the processor 30 may write the object data in the object area 52. The object data may be invalidated (or deleted) in the storage device 100 or may be maintained in the storage device 100.

Figure 11:
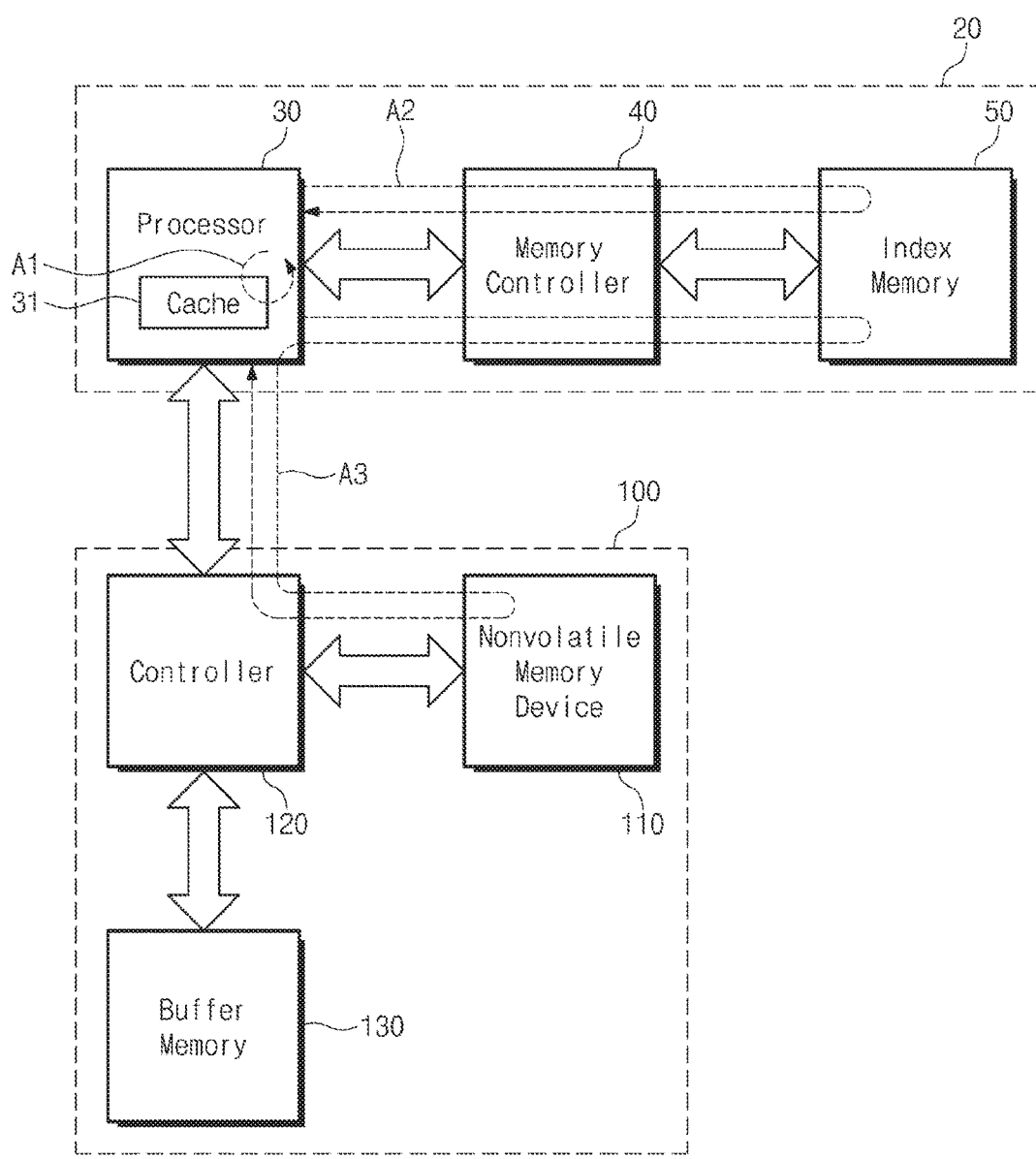
FIG. 11 illustrates an example where a write or read request described with reference to FIGS. 9 and 10 is hierarchically processed in the computing system of FIG. 1.

FIG. 11 illustrates an example where a write or read request described with reference to FIGS. 9 and 10 is hierarchically processed in the computing system 10 of FIG. 1. Referring to FIG. 11, when a cache hit occurs, as indicated by a first arrow A1, a write request or a read request is completed in the cache 31. That is, the read request or the write request is completed in the processor 30 without accessing the random access memory (RAM) 50 or the storage device 100. Thus, an access indicated by the first arrow A1 may have the highest operating speed.

When a hit of the random access memory (RAM) 50, as indicated by a second arrow A2, a write request or a read request is completed by accessing the random access memory (RAM) 50. Although an access indicated by the second arrow A2 is slower than the access indicated by the first arrow A1, it may be faster than an access indicated by a third arrow A3.

When a hit does not occur, as indicated by the third arrow A3, the write request or the read request accesses the random access memory (RAM) 50 to refer to an index entity and is completed by accessing the storage device 100. Thus, an access indicated by the third arrow A3 may be slowest.

As described above, the computing system 10 may hierarchically process an access request of object data depending on a size of the object data and whether a hit of the object data occurs. Thus, a speed of the computing system 10 is improved and consumption of resources is reduced.

Figure 12:
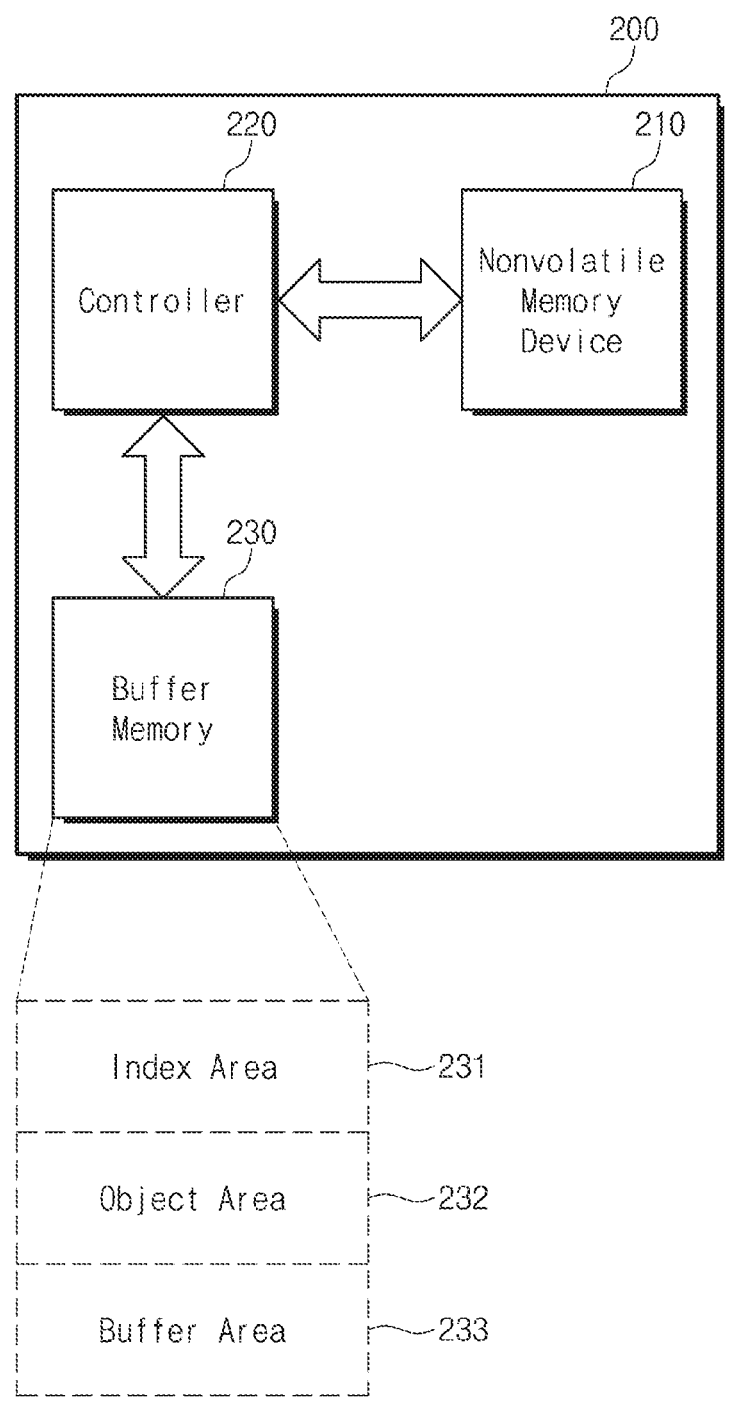
FIG. 12 is a block diagram illustrating a storage device according to example embodiments of the present disclosure.

FIG. 12 is a block diagram illustrating a storage device 200 according to example embodiments of the present disclosure. Referring to FIG. 12, the storage device 200 includes a nonvolatile memory device 210, a controller 220, and a buffer memory 230.

The nonvolatile memory device 210 may include a flash memory, a phase change random access memory (PRAM), a magnetic random access memory (MRAM), a resistive random access memory (RRAM), a ferroelectric random access memory (FRAM), etc.

The controller 220 may perform a write, read or erase operation according to a request of an external host device. The controller 220 may receive and process an object-based access request. The controller 220 may perform operations associated with the object data such as those described in the present disclosure for FIGS. 1 through 11. The operations performed by the controller 220 may be the same as or similar to those performed by the processor 30 in FIGS. 1 through 11.

The controller 220 may divide the buffer memory 230 into an index area 231, an object area 232, and a buffer area 233 to manage them. The controller 220 may control and use the index area 231 and the object area 232 similar to the index area 51 and the object area 52 described with reference to FIGS. 1 through 11.

The method in which the processor 30 controls or accesses the random access memory (RAM) 50 and the storage device 100 described in FIGS. 1 through 11 may be applied to a method in which the controller 220 controls or accesses the nonvolatile memory device 210 and the buffer memory 230.

According to example embodiments of the present disclosure, a part of data to be written in a storage device is written in a random access memory. Thus, an overall operating speed of a system including the storage device and the random access memory.

The above-disclosed subject matter is to be considered illustrative, and not restrictive, and the appended claims are intended to cover all such modifications, enhancements, and other embodiments, which fall within the true spirit and scope of the concepts described herein. Thus, to the maximum extent allowed by law, the scope of the concepts described is to be determined by the broadest permissible interpretation of the following claims and their equivalents, and shall not be restricted or limited by the foregoing detailed description.

What is claimed is:

1. A method of controlling a storage device and a random access memory, comprising:
   when a size of write-requested data is greater than a threshold, writing the write-requested data in the storage device and writing an address of the storage device in which the write-requested data is written in the random access memory;
   when the size of the write-requested data is smaller than or equal to the threshold, writing the write-requested data in a second area of the random access memory, writing an identifier of the write-requested data in a first area of the random access memory, and writing location information of the random access memory in which the write-requested data is written in the first area of the random access memory together with the identifier,
   wherein the threshold is correlated to a size greater than a size of an area allocated to store the address in the random access memory.

2. The method of claim 1,
   wherein, when the size of the write-requested data is greater than the threshold, the address is written in the first area together with the identifier.

3. The method of claim 1, further comprising:
   when the size of the write-requested data is smaller than or equal to the threshold and a free space of the second area is smaller than the size of the write-requested data, writing the write-requested data in the storage device and writing an address of the storage device in which the write-requested data is written in the random access memory.

4. The method of claim 1, further comprising:
   when a free space of the first area is smaller than a size of the identifier of the write-requested data and the address, reducing the free space of the second area and setting the free space released from the second area as a free space of the first area.

5. The method of claim 1, further comprising:
when a free space of the first area is smaller than a size of the identifier of the write-requested data and the address, writing previous data which is previously written in the second area in the storage device and setting a space of the second area in which the previous data is stored as a free space of the first area.

6. The method of claim 5,
wherein an address of the storage device in which the previous data is written is stored in the first area in relation to a previous identifier previously stored in the first area in relation to the previous data.

7. The method of claim 1,
wherein when the size of the write-requested data is smaller than or equal to the size of the area allocated to store the address, the write-requested data is stored in the first area together with the identifier.

8. The method of claim 1, further comprising:
writing the identifier of the write-requested data and information about a location where the write-requested data is written in the random access memory.

9. The method of claim 8,
wherein, when previous data associated with the identifier is previously written in the random access memory, overwriting the previous data of the random access memory with the write-requested data.

10. The method of claim 8, further comprising:
when previous data associated with the identifier is previously stored in a cache memory, overwriting the previous data of the cache memory with the write-requested data.

11. The method of claim 8, further comprising:
when read-requested data is stored in the random access memory, reading the read-requested data from the random access memory with reference to an identifier of the read-requested data and location information stored in the random access memory, and outputting the read-requested data.

12. The method of claim 8, further comprising:
when read-requested data is stored in the storage device, reading the read-requested data from the storage device with reference to an identifier of the read-requested data and location information stored in the random access memory, and outputting the read-requested data.

13. A method of controlling a nonvolatile memory device and a buffer memory, comprising:
when a size of write-requested data is greater than a threshold, writing, by a controller, the write-requested data in the nonvolatile memory device and writing an address of the nonvolatile memory device in the buffer memory as an index; and
when the size of the write-requested data is smaller than or equal to the threshold, writing, by the controller, the write-requested data in the buffer memory and writing location information of the write-requested data in the buffer memory as the index,
wherein the threshold is correlated to a size greater than a size of an area allocated to store the address in the buffer memory.

14. A method of managing memory, comprising:
determining, based on receipt of a first write request, whether a size of first data to be written to a memory is greater than a threshold;
writing the first data in a storage device of the memory and writing an address of the storage device at which the first data is written in an area of a random access memory of the memory separate from the storage device, based on determining that the size of the first data to be written to the memory is greater than the threshold;
determining, based on receipt of a second write request, whether a size of second data to be written to the memory is greater than the threshold; and
writing the second data in a second area of the random access memory, and writing location information of the random access memory in which the second data is written in a first area of the random access memory together with an identifier of the second data, based on determining that the size of the second data to be written to the memory is not greater than the threshold.

15. The method of claim 14,
wherein the threshold is correlated to the area, and the area is pre-allocated to storing addresses of the memory at which data is written.

16. The method of claim 14, further comprising:
confirming that the random access memory has enough free space to store the second data before writing the second data in the random access memory.

17. The method of claim 14,
wherein the second data is stored in the random access memory separate from the area of the random access memory used to store the address of the storage device at which the first data is written.

18. The method of claim 14,
wherein the address of the storage device at which the first data is written is written in the first area of the random access memory together with the location information of the random access memory in which the second data is written and together with the identifier of the second data.

* * * * *